United States Patent
Adriansens

(10) Patent No.: US 8,192,656 B2
(45) Date of Patent: Jun. 5, 2012

(54) INSTALLATION FOR THE MANUFACTURE OF CONTAINERS FROM A PREFORM AND METHOD OF CONTROLLING THE BLOW-MOLDING MEANS OF SUCH AN INSTALLATION

(75) Inventor: Eric Adriansens, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 12/667,911

(22) PCT Filed: Jul. 15, 2008

(86) PCT No.: PCT/EP2008/059221
§ 371 (c)(1),
(2), (4) Date: May 13, 2010

(87) PCT Pub. No.: WO2009/010505
PCT Pub. Date: Jan. 22, 2009

(65) Prior Publication Data
US 2010/0213629 A1    Aug. 26, 2010

(30) Foreign Application Priority Data
Jul. 19, 2007   (FR) ...................... 0756611

(51) Int. Cl.
*B29C 49/08* (2006.01)
*B29C 49/78* (2006.01)

(52) U.S. Cl. ................. 264/40.5; 264/523; 264/532

(58) Field of Classification Search ................. None
See application file for complete search history.

(56) References Cited

U.S. PATENT DOCUMENTS

| | | |
|---|---|---|
| 6,464,486 B1 | 10/2002 | Barray et al. |
| 6,562,281 B1 | 5/2003 | Marchau et al. |
| 6,769,895 B2 | 8/2004 | Derouault et al. |
| 6,805,548 B1 | 10/2004 | Evrard |
| 7,004,745 B2 | 2/2006 | Galloni |
| 7,563,092 B2 | 7/2009 | Mie |

FOREIGN PATENT DOCUMENTS

| | | |
|---|---|---|
| FR | 2 653 058 A1 | 4/1991 |
| FR | 2 764 544 A1 | 12/1998 |
| FR | 2 766 121 A1 | 1/1999 |
| FR | 2 876 942 A1 | 4/2006 |
| WO | WO 00/69661 A1 | 11/2000 |
| WO | WO 01/53063 A1 | 7/2001 |
| WO | WO 02/24435 A1 | 3/2002 |

OTHER PUBLICATIONS

International Search Report, dated Oct. 24, 2008, from corresponding PCT application.

*Primary Examiner* — Monica A Huson

(74) *Attorney, Agent, or Firm* — Young & Thompson

(57) ABSTRACT

An installation for manufacturing containers by moulding from a perform includes at least one moulding unit having a control device for controlling at least one nozzle associated with a mould, the nozzle being vertically movably mounted so as to move vertically between a top position and a bottom position in which the mould is closed. The nozzle covers at least one flow opening that includes an upper horizontal wall of the mould. The manufacture involves at least a first step including, the mould being closed, systematically controlling the vertical descent of the nozzle towards the bottom position independently of the presence or absence of a preform in the mould so that, both when the installation is operating and when it is at rest, the internal volume of the mould is isolated in order to avoid the risk of airborne particulate contamination.

9 Claims, 4 Drawing Sheets

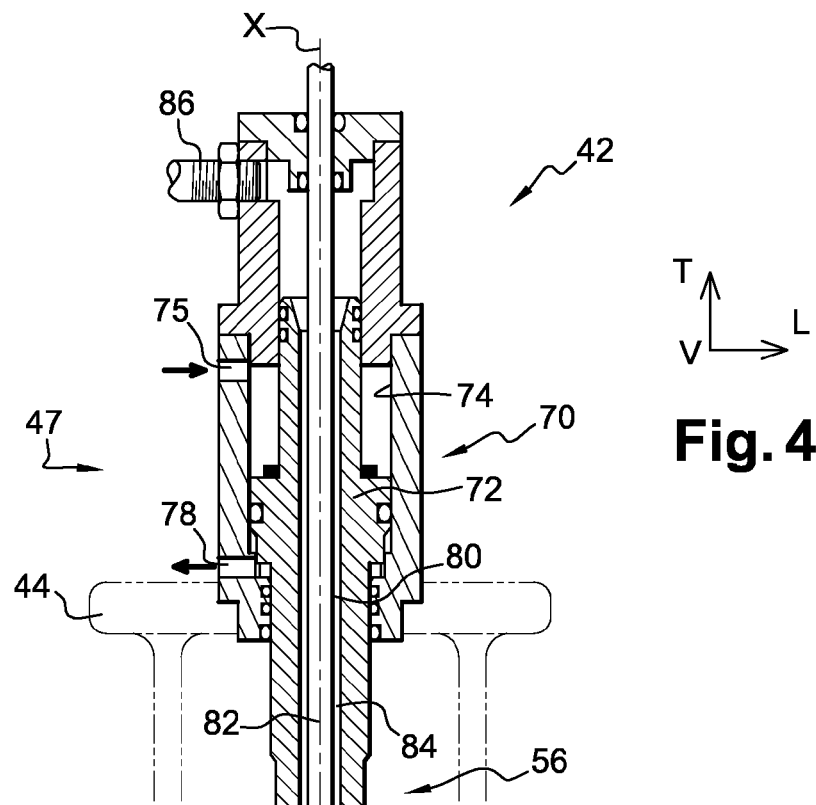
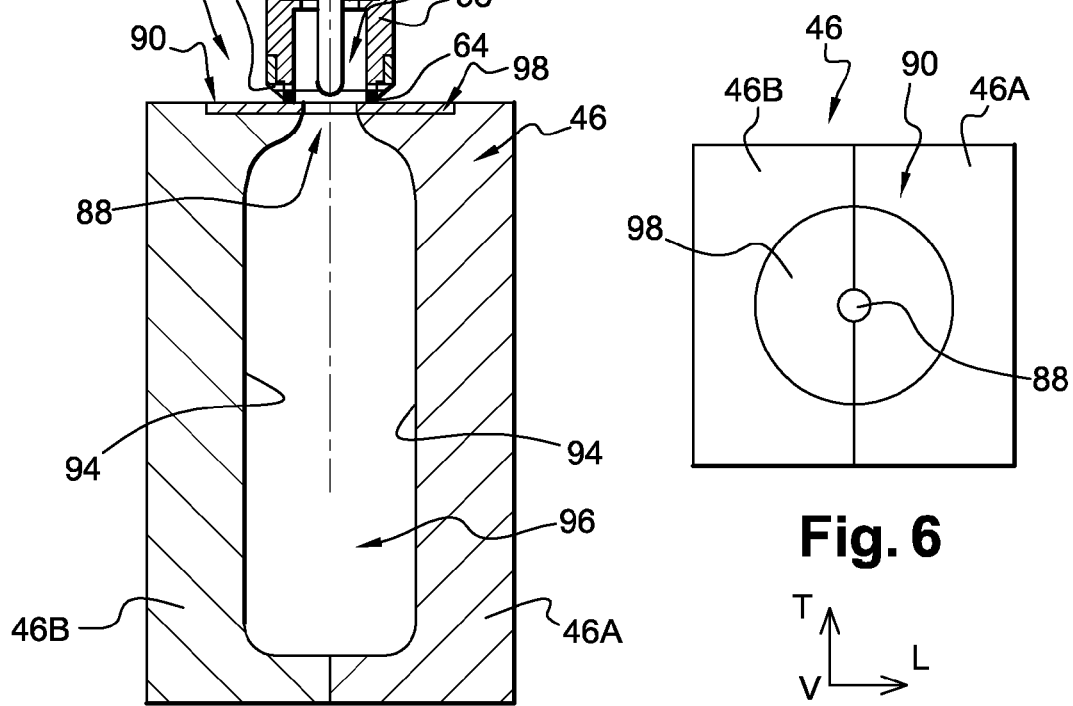
Fig. 4
Fig. 6

_US 8,192,656 B2_

INSTALLATION FOR THE MANUFACTURE OF CONTAINERS FROM A PREFORM AND METHOD OF CONTROLLING THE BLOW-MOLDING MEANS OF SUCH AN INSTALLATION

BACKGROUND OF THE INVENTION

1. Field of the Invention

The present invention concerns an installation for the manufacture of containers from a preform and a method of controlling blow-molding means of such an installation.

The invention concerns more particularly an installation for manufacturing containers, in particular bottles, by blow-molding or by stretch-blow-molding from a thermoplastic material preform, the installation including at least:
- a preform feeding device adapted to feed an entry of the installation with preforms,
- a thermal conditioning unit including at least one oven including means for heating preforms arranged between an entry area to which the preforms are fed by the feed device and an exit area which opens into a transfer area of the installation,
- a first transfer device in the transfer area adapted to transfer thermally conditioned preforms from the exit area of the oven to a feeding area of a molding unit,
- the molding unit including a wheel equipped with a plurality of molds distributed in the circumferential direction and associated blow-molding or stretch-blow-molding means, the wheel being driven in rotation so that each mold follows a transformation cycle from said feed area to a evacuation area,
- a second transfer device in the transfer area adapted to transfer containers obtained from the evacuation area of the molding unit to an exit of the installation, and
- a control device adapted to control movement of the blow-molding or stretch-blow-molding means that include at least one nozzle associated with each mold.

2. Description of the Related Art

Many installations of this type are known in the art, and include at least one molding unit equipped with a control device for the blow-molding or stretch-blow-molding means adapted to control movement of at least one nozzle that is associated with each mold carried by the wheel of the molding unit.

As is known in the art, the nozzle is generally arranged above the mold and mounted to move vertically between at least two end positions, respectively a top or waiting position and a bottom or blow-molding position.

The top position of the nozzle corresponds to an open position of the mold, i.e. the position that each mold occupies when it is in the feed area or the evacuation area to allow respectively the initial introduction of the preform and the final evacuation of the container obtained after the transformation cycle.

Conversely, the bottom position of the nozzle corresponds to the closed position that each mold occupies during the cycle of transforming the preform into a container that is carried out on the wheel between said feed and evacuation areas.

In the bottom position, the mold being closed, the nozzle caps at least one orifice of the mold through which the neck of the preform passes. This orifice is provided in a horizontal top wall of the mold, for example, and is adapted to allow the neck of the preform to pass through it when the blow-molding unit is operating with preforms in the "neck at top" position.

When the mold is closed, the neck of the preform projects above the wall while the body, which extends vertically under the neck, is received inside the mold.

In such an installation, movement of the blower nozzle is commanded selectively by the control device because descent from the top or waiting position to the bottom or blow-molding position is effected only if a preform is introduced into the mold.

Now, either intentionally or unintentionally, it is possible for the stream of preforms to include a "gap", i.e. an empty space on the transfer means that is reflected by an absence of any preform in the feeding area, as a consequence of which no preform can be introduced into the mold.

By way of example there are cited the situation in which a given application uses only alternate molds on the blow-molding wheel, in particular because of the required container output rate, which is determined as a function of the timing of a filling unit downstream of the exit from the installation, for example, and the situation in which a preform is eliminated because of non-conformance, in particular non-conformance of its heating profile, which can be checked in the transfer area by means of a thermal camera type device.

Nevertheless, even if no preform is introduced, the wheel continues to operate to continue the transformation cycle in progress in the other molds so that the empty mold in the feed area is shifted by one step to the next station at a rate determined to be necessary for synchronizing the units of the installation.

The molding unit usually includes actuating means, for example of the mechanical type, for opening and closing the molds and which cause automatic opening and closing synchronized with the transformation cycle, in particular closing of the mold in the feed area and, conversely, opening of the mold in the evacuation area.

Accordingly, independently of the presence or the absence of a preform, each mold is automatically closed by the actuating means.

However, in the case of a missing preform, an empty mold is not in fact closed when it is in the closed position as the orifice is open because the blow-molding means remain in the top position because of the missing preform.

It is possible for the interior of the mold and the external environment to communicate via this orifice.

This is why there is a risk of airborne particle contamination of the empty mold, in particular by germs, bacteria, etc. present in the surrounding atmosphere and liable to contaminate the interior of the mold and consequently preforms and containers subsequently manufactured by the contaminated mold.

Such risks of contamination are unacceptable in installations in which a constant concern is to improve hygiene because of ever stricter demands in respect of the sterile or aseptic nature of the containers manufactured.

SUMMARY OF THE INVENTION

The present invention aims in particular to solve the aforementioned problems and especially to overcome the risk of airborne particle contamination of the molding unit.

To this end, the invention proposes a method of controlling an installation for manufacturing containers, in particular bottles, by blow-molding or by stretch-blow-molding from a thermoplastic material form, the installation including at least one molding unit equipped with a control device adapted to control movement of at least one blow-molding or stretch-blow-molding nozzle which is associated with a mold, in which the nozzle is mounted to be mobile vertically between a top position and a bottom position in which, the mold being in a closed position, the nozzle caps at least one orifice for the neck of the preform that includes a top horizontal wall of the mold, characterized in that the control method includes at least one first step entailing, the mold being in a closed position, systematically commanding, independently of the presence or the absence of a preform in the mold, vertical lowering of the nozzle toward the bottom position so that, whether the installation is operating or stopped, the interior volume of the mold is isolated from the exterior environment to prevent the risk of airborne particle contamination.

The invention provides a simple and economical way to combat the risks of particle contamination, as the control method can advantageously be used in existing installations with few or no modifications.

The method advantageously includes at least one preliminary step of detecting the presence or absence of a preform in the mold.

The installation is preferably of the type in which the nozzle of the blow-molding unit is adapted to effect at least one blow-molding operation by blowing a fluid under pressure into the interior of the preform via a bottom orifice in order to proceed to its transformation into a container.

The method advantageously includes at least one second step of selectively commanding introduction into the nozzle of the fluid under pressure so that the fluid under pressure is not introduced into the nozzle in the absence of a preform in the mold.

The installation is preferably of the type in which the nozzle of the blow-molding unit of the installation includes an elongating rod adapted to effect a stretching operation that precedes or accompanies the blow-molding operation.

The method advantageously includes at least one third step of selectively commanding movement of the elongating rod so that the downward sliding of the rod is not effected in the absence of a preform in the mold.

The invention further concerns an installation for the manufacture of containers, of the type described above, characterized in that the control device is controlled in accordance with the control method of the invention and in that the molding unit includes detection means adapted to detect the presence or absence of a preform and to supply to the control device a signal representative of the presence or absence of a preform in the mold to allow selective execution of the second step and/or the third step of the control method.

The control device is advantageously adapted to control means for actuating the blow-molding or stretch-blow-molding means adapted systematically to cause movement of the nozzle and selectively to cause admission into the nozzle of the blow-molding fluid and/or movement of the elongating rod.

The actuating means of the blow-molding or stretch-blow-molding means preferably consist of pneumatic means such as pneumatic actuators.

The installation preferably includes at least one protective enclosure forming a box-section disposed around at least the molding unit, the transfer area and the exit area of the oven of the installation, the enclosure delimiting in particular around the wheel a U-shaped peripheral area extending from the feed area to the evacuation area.

The installation advantageously includes a system for blowing filtered air into the interior of the enclosure adapted to direct a flow of air at least above the feed area and the evacuation area in which each mold is in an open position to prevent contamination of the mold by airborne particles.

BRIEF DESCRIPTION OF THE DRAWING FIGURES

Other features and advantages of the invention will appear on reading the following detailed description, for an understanding of which see the appended drawings, in which:

FIG. 4 is a detail view in section which, in a similar way to FIG. 2, shows the nozzle of the invention in the bottom position and the mold of the invention in the closed position with no preform in the mold;

FIGS. 5 and 6 are plan views of the mold in the closed position, respectively in the presence of a preform and in the absence of a preform, in order to show by comparison that the orifice remains open in the absence of a preform.

DETAILED DESCRIPTION OF THE INVENTION

In the description and the claims the terms "top" and "bottom", etc. and the orientations "longitudinal", "vertical" and "transversal" are used in a nonlimiting way to designate elements according to the definitions given in the description and to the axes (L, V, T) represented in the figures.

Figure 1:
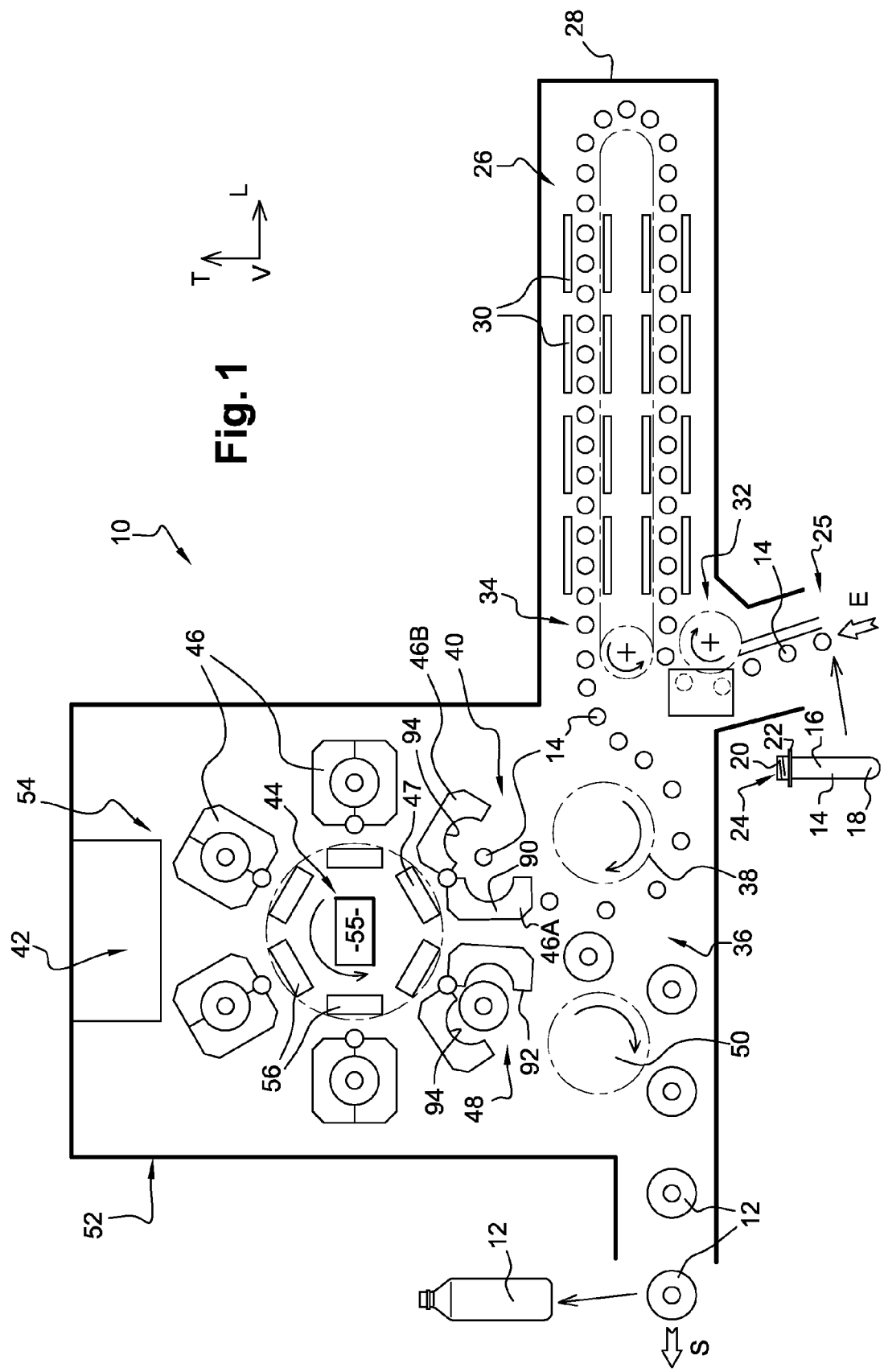
FIG. 1 is a diagrammatic plan view showing one example of an installation for manufacturing containers including a control device for a molding unit operating in accordance with the control method of the invention.

FIG. 1 represents diagrammatically an installation 10 for the manufacture of containers 12, in particular bottles, by blow-molding or by stretch-blow-molding from a preform 14 in thermoplastic material, for example PET (polyethylene terephthalate).

FIG. 1 shows in detail one embodiment of a preform 14, sometimes called a blank, for the manufacture of a hollow body container, such as a bottle, a flask, etc., advantageously by a transformation method employing blow-molding or stretch-blow-molding.

By definition, in the remainder of the present description the term "container" designates either the finished container, such as the bottle shown in detail in FIG. 1, which is for example obtained by a manufacturing process with only one step of blow-molding a preform leading directly to the finished container, or an intermediate container obtained when using a method with a number of blow-molding or stretch-blow-molding steps.

The preforms 14 are generally produced by an injection molding process and for example molded elsewhere than at the location of the container manufacturing installation.

As can be seen better in the detail in FIG. 1, the preform 14 generally has a globally tubular body 16 of cylindrical section in a horizontal section plane, said body 16 extending along a vertical axis, here in a "neck at top" position.

Of course, the "neck at top" or alternatively "neck at bottom" relative position of the preform 14 is a function of the installation and overturning devices for going from one to the other are well known to the person skilled the art in this technical field.

The preform 14 is closed at its bottom end by a substantially hemispherical bottom 18, which corresponds to the portion of the body of the preform intended to form the bottom of the container 12. Conversely, the preform 14 is open at its top end, which is conformed as a neck 20 that already has the final shape of the neck of the container 12.

The preform 14 includes at the junction between the body 16 and the neck 20 a flange 22 that extends radially outward, projecting relative to the body 16 and the neck 20.

The neck 20 delimits an annular opening 24 centered on the vertical axis and for example includes on its external surface a screwthread adapted to allow subsequent placement of screw closure means of the container 12, such as a cap (not shown).

Alternatively, the neck 20 has on its external surface attachment means intended to allow subsequent placement of complementary closure means for the container 12 of the snap-on or seal type, such as a plastic or metal foil.

In the embodiment represented in FIG. 1, the installation 10 for manufacturing containers 12 includes at least one preform feeding device 25 adapted to feed preforms 14 to an entry E of the installation 10 in the direction of the arrow.

The installation 10 includes a thermal conditioning unit 26 including at least one oven 28 including means 30 for heating the preforms 14 arranged between an entry area 32 to which the preforms 14 are conveyed by the feed device 25 and an exit area 34 that leads into a transfer area 36 of the installation 10.

The installation 10 preferably includes a first transfer device 38 in the transfer area 36 for transferring thermally conditioned preforms 14 from the exit area 34 of the oven 28 to a feed area 40 of a molding unit 42.

Figure 2:
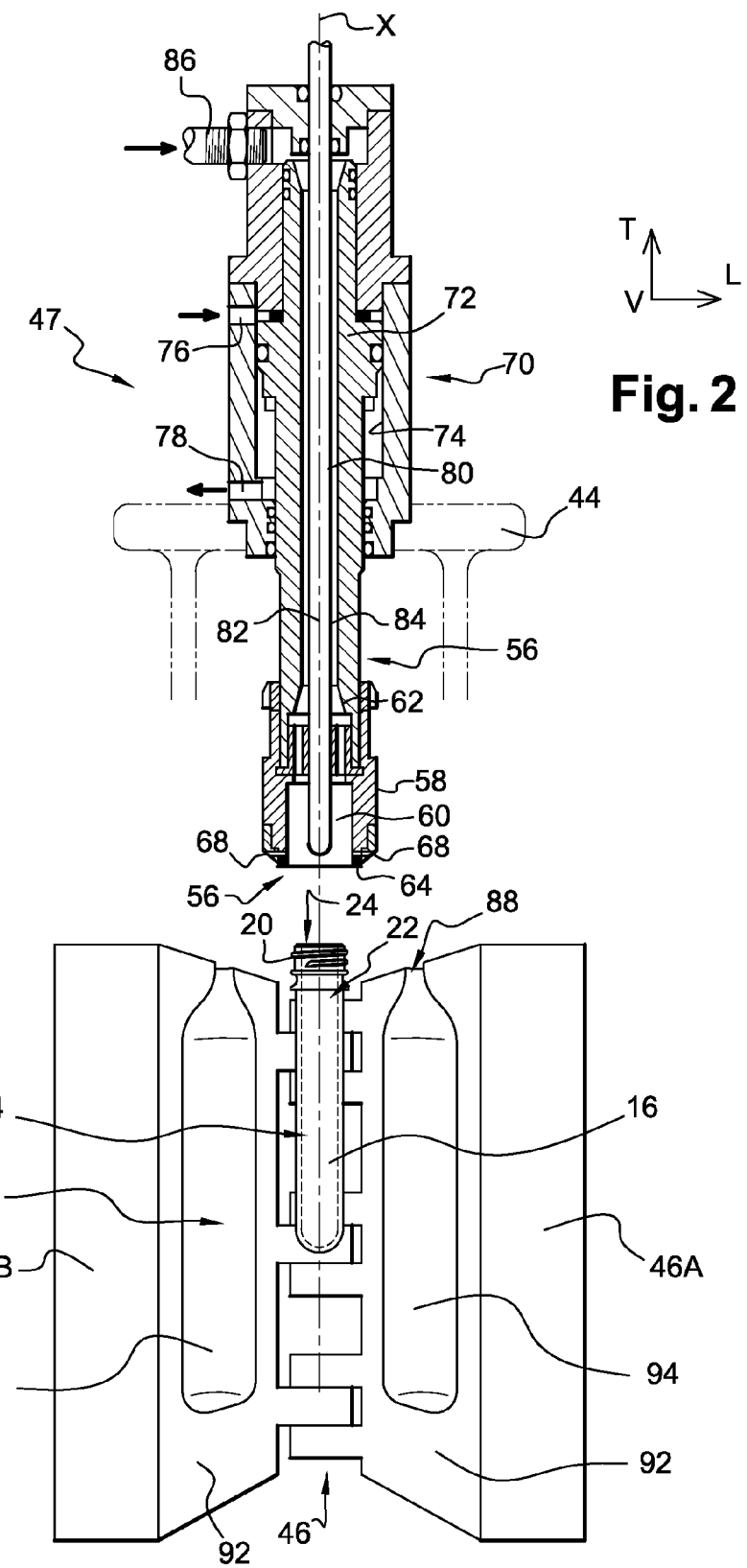
FIG. 2 is a detail view in section that represents a nozzle and a mold of one of the stations of the wheel of the molding unit of the installation and shows the nozzle in the top position and the mold in the open position.
Figure 3:
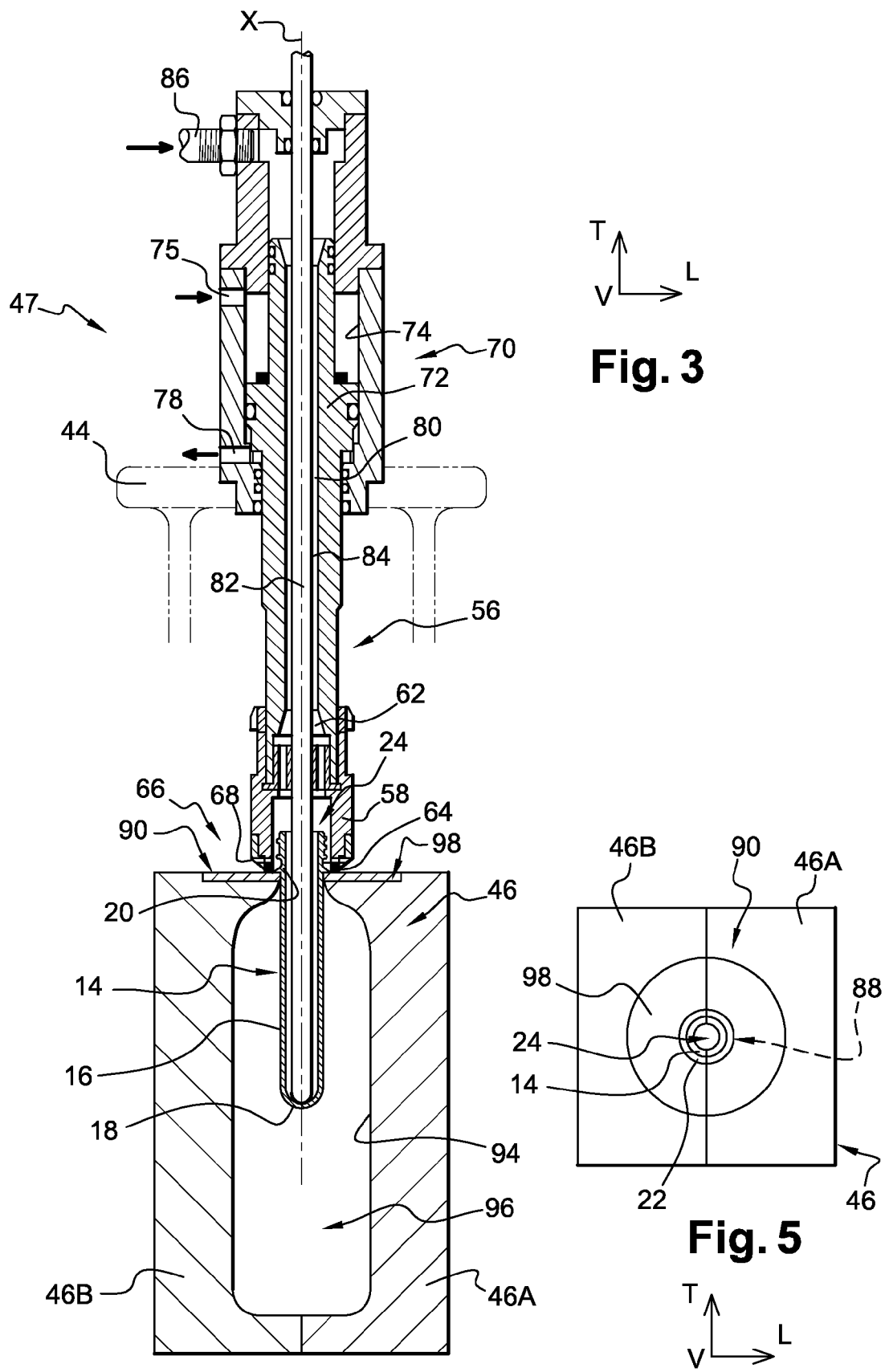
FIG. 3 is a detail view in section which, in a similar way to FIG. 2, shows the nozzle in the bottom position and the mold in the closed position in the absence of a preform.

The molding unit 42 includes a wheel 44 equipped with a plurality of circumferentially distributed molds 46 and associated blow-molding or stretch-blow-molding means 47 which are shown in FIGS. 2 to 4 and described hereinafter.

Each mold 46 is preferably a "wallet" mold that includes at least one imprint corresponding to the container 12 to be manufactured, here a bottle, for example.

One such mold is described for example in the document FR-A-2.653.058 concerning such a molding unit, also known as a "mold support".

For the mold to comprise only two half-molds 46A and 46B is possible if the container 12 to be manufactured has a relatively simple shape and is easily extracted from the mold. This applies in particular if the bottom of the container 12 has no pronounced relief, for example if it has a convex hemispherical bottom or a flat bottom.

On the other hand, if, as in most cases, the bottom has a complex conformation, for example when the bottom has a petal-like shape or a concave domed shape, the container 12 cannot be removed from a two-part mold 46 without deforming it and thus without damaging it.

This is why three-part molds are used for the manufacture of such containers with a complex shape bottom, comprising two half-molds mobile relative to each other for molding the body of the container and a mold bottom movable axially to mold the bottom of the container.

For simplicity, and without this being limiting on the invention, the mold 46 is represented as a mold in two parts 46A and 46B.

The molding unit 42 includes actuating means (not shown) adapted to command systematically and synchronously closing and opening of the two half-molds in the feed area 40 and the evacuation area 48, respectively.

By way of example, mechanical type actuating means (not shown) include a roller fastened to the half-molds by transmission means that cooperate with a cam disposed laterally and having a required profile, for example.

See for example the document WO-A-00/69614 in the name of the Applicant concerning a mold closing and locking mechanism intended to be fitted to a blow-molding unit.

The wheel 44 is driven in rotation so that each mold 46 follows a transformation cycle from said feed area 40 to the evacuation area 48.

In the feed area 40, the mold 46 carried by the wheel 44 is opened to allow introduction of the preform 14 previously thermally conditioned by the oven 28 and then closed during the cycle of transformation of the preform 14 by blow-molding effected in parallel with the rotation of the wheel 44 until the mold 46 reaches the evacuation area 48 in which it is opened again to allow evacuation of the container 12 obtained.

To this end, the installation 10 includes a second transfer device 50 located in the transfer area 36 which is adapted to transfer the containers 12 obtained from the evacuation area 48 of the molding unit 42 to an exit S from the installation 10 through which the containers 12 are evacuated.

The installation 10 advantageously includes at least one protective enclosure 52 forming a box section disposed so as to surround at least the molding unit 42, the transfer area 36 and the exit area 34 of the oven 28 of the installation 10, said enclosure 52 thus delimiting a confined interior volume around the components of the installation 10.

The protective enclosure 52 preferably delimits, especially around the wheel 44, a U-shaped peripheral area 54 that extends from the feed area 40 to the evacuation area 48.

The protective enclosure 52 preferably consists of a set of vertical walls formed by panels for example and at least one horizontal wall forming a ceiling (not shown) that advantageously covers the molding unit 42, the transfer area 36 and the exit area 34 of the oven 28 of the installation 10.

The molding unit 42 further includes a control device 55 for controlling movement of at least one blow-molding or stretch-blow-molding nozzle 56 associated with each mold 46 of the wheel 44.

One possible embodiment of the blow-molding means 47, here stretch-blow-molding means, shown more particularly in FIGS. 2 to 4 is described in more detail next. The blow-molding or stretch-blow-molding means 47 therefore consist mainly of a nozzle 56.

The nozzle 56 has a body 58 of substantially cylindrical sleeve shape pierced over the whole of its length by a coaxial hole consisting of two orifices 60, 62 coaxial with the axis X of the nozzle.

The first nozzle 60 constitutes the final bottom orifice for feeding fluid into the preform 14 when the nozzle is in the bottom or blow-molding position.

The nozzle 56 advantageously includes a lip seal 64 fixed around the second end of the first orifice 60 forming a tip 66, the lip seal 64 projecting axially to provide a seal during blow-molding by cooperating with a facing part of the mold 46.

The tip 66 preferably includes vents 68 regularly distributed in the circumferential direction and extending radially through the body 58.

The nozzle 56 is for example fixed by its side opposite that in which the first orifice 60 is formed to an actuator 70. To be more precise, the body 58 is fastened to a piston 72 sliding in a cylinder 74.

The body 58 of the nozzle 56 is preferably screwed to the end of the piston 72 at the level of the second top orifice 62 formed in the body 58, which is screwthreaded, the end of the piston 72 being screwthreaded in a corresponding manner.

The actuator 70 is advantageously a "double-acting" actuator.

The actuator 70 includes a first orifice 76 provided at one end of the cylinder 74 enabling vertically downward movement of the piston 72, and thus of the nozzle 56, toward the mold 46 and a second orifice 78 conversely allowing upward movement of the nozzle 56 toward the top position shown in FIG. 2.

In a manner that is known in the art, the piston 72 is pierced at its center, over its entire height, by a tubular passage 80 that is coaxial with the vertical axis X of symmetry of the nozzle 56 and the actuator 70.

The nozzle 56 advantageously includes a rod 82 for stretching the preform 14 that is adapted to slide inside the passage 80.

The inside diameter of the passage 80 is greater than the outside diameter of the rod 82, with the result that there remains an annular space 84 around the rod 82 to allow passage of the pre-blow-molding and/or blow-molding fluid toward the first orifice 60 of the nozzle 56 and thus toward the preform 14 in order to transform the preform by blow-molding it in the mold 46 to produce a container 12.

The annular space 84 communicates selectively with a pressurized fluid feed pipe 86 for pre-blow-molding and/or blow-molding the preform 14, said pipe 86 being connected to one or more fluid feed sources.

The elongating rod 82 is adapted to slide vertically relative to the piston 72 and the nozzle 56 thanks to actuating means (not shown) that advantageously consist of another actuator or any other appropriate means.

The means for actuating the elongating rod 82 are advantageously independent of the means for moving the nozzle 46 between top and bottom positions.

The nozzle 56 is mounted to be mobile vertically between the top position (FIG. 2) and the bottom position (FIG. 3) in which, the mold 46 being in the closed position, the nozzle 56 caps at least one orifice 88 for the neck 20 of the preform 14 that includes a top horizontal wall 90 of the mold 46.

As shown in FIG. 2, the mold 46 includes two half-molds 46A and 46B that here are in the open position, said open position corresponding to the position occupied by the mold 46 in the feed area 40 or the evacuation area 48 respectively to allow an operation of loading a preform 14 into the mold 46 or an operation of discharging the mold 46 by removing the container 12, here a bottle, obtained after the transformation cycle.

Each half-mold 46A, 46B has in its vertical internal face 92 an imprint 94, the combination of which imprints in the vertical mold sealing plane corresponds to the shape of the finished container 12.

As shown in FIG. 3, the mold 46 includes two half-molds 46A and 46B that here are in the closed position, i.e. in the position occupied by the mold 46 between the feed area 40 and the evacuation area 48 during the transformation cycle.

The upper part of the mold 46 advantageously includes a ring 98 which, consisting of two facing half-rings fastened to the respective half-molds 46A, 46B, centrally occupy the orifice 88 for the preform 14 when the mold 46 is in the closed position (FIGS. 5 and 6). The ring 98 then constitutes the horizontal top wall 90 of the mold 46.

The standard operation of such a container manufacturing installation 10, shown more particularly in FIGS. 2 and 3, is described hereinafter.

As shown in FIG. 1 representing the installation 10, the feed device 25 conveys the preform 14 into the entry area 32 and then through the thermal conditioning oven 28, the heating means 30 of which raise the temperature of the preform 14 to make it malleable before the blow-molding and/or stretch-blow-molding and molding operations.

To this end, the first transfer device 38 moves the preform 14 rapidly, so that it does not resolidify, from the exit area 34 of the oven 28 to the feed area 40, in which it is offered up with a first orientation, here with the neck at the top, for example, in order finally to be introduced into the mold 46 in the open position.

The two half-molds 46A, 46B are then closed onto the introduced preform 14, which is then held in a vertical position in the mold 46, the flange 22 bearing on the ring 98, for example.

Accordingly, once the two parts 46A and 46B of the mold have been closed, the preform 14 or to be more precise the body 16 is in the interior volume 96 of the mold 46 that delimits the combination of imprints 94 of the half-molds 46A, 46B.

It is then possible by means of the nozzle 56 to inject sterile compressed air, for example, into the interior of the neck 20 of the preform 14 projecting out of the mold 46.

Blow-molding the preform 14 inserted into the mold 46 and previously heated to soften it causes deformation of the preform 14 which, because of the effect of the pressure of the air introduced via the opening 24, tends to be pressed against the interior wall of each imprint 94 of the two closed mold parts 46.

If the transformation process is of the stretch-blow-molding type, the elongating rod 82 is advantageously used, preferably under the control of the control device 54, and then descends along the axis X of symmetry to enter the preform 14 and stretch it in the interior volume 96 of the mold 46.

FIG. 3 shows the nozzle 56 in the bottom blow-molding position. The nozzle tip 66 bears against the mold 46 so that the lip seal 64 cooperates with the ring 98.

The elongating rod 82 is represented in a position in which its free end bears on the bottom 18 of the preform 14, i.e. in a position immediately preceding the aforementioned operation of stretch-blow-molding the preform.

As shown in FIG. 3, the dimensions of the first orifice 60 of the nozzle 56 are such that the neck 20 of the preform 14 is more than adequately contained, i.e. capped, by this orifice 60 and the mold 46 and the preform 14 are then completely and hermetically isolated from the exterior environment, in particular from air that is potentially pathogenic and a potential carrier of contaminating particles.

The description just given corresponds to "normal" operation of the installation 10 although it sometimes happens, as explained hereinabove in the preamble, that a preform 14 is missing and that the mold 46 in the feed area 40 is then empty when closed.

In such a configuration, i.e. in the absence of a preform 14, the control device 55 usually holds the nozzle 56 in the top position so that the associated mold 46 follows a path corresponding to the transformation cycle without being completely closed.

Although the mold 46 is closed, the orifice 88, having no preform 14 passing through it, is unobstructed and consequently allows communication between the exterior air or environment and the interior volume 96 of the mold 46 that delimits the imprints 94.

This is why there is a risk of contamination by airborne particles, such as bacteria, germs, etc. that are liable to penetrate into the interior volume 96 via the orifice 88.

Moreover, as the rotating wheel 44 acts like a fan and causes considerable turbulence inside the enclosure 52, which has acoustic isolation and safety functions, the enclosure 52 is not hermetically sealed.

The method of the invention of controlling the installation 10, and more particularly the control device 55, thus includes a first step, with the mold 46 in the closed position, entailing systematically, i.e. independently of the presence or absence of a preform 14 in the mold 46, commanding vertical descent of the nozzle 56 toward the bottom blow-molding position so that, whether the installation is operating or stopped, the interior volume 96 of the mold 46 is isolated from the exterior environment to avoid the risk of airborne particle contamination.

Accordingly, the nozzle 56 is lowered from its top position to its bottom position systematically, rather than selectively as was previously the case.

For example, the control device 55 is advantageously an automatic device that can be programmed to execute systematically, in particular in the absence of a preform, the lowering of the nozzle 56 in order to isolate the mold 46.

Thus the means for actuating the nozzle 56, such as the actuator 70, could alternatively be replaced by mechanical or other actuating means similar to those for closing the mold 46 and which would systematically lower the nozzle 56.

The control method nevertheless preferably includes at least one preliminary step of detecting the presence or absence of a preform 14 in the mold 46.

Thanks to the lip seal 64, lowering just the tip 66 of the nozzle 56 isolates the mold 46 by totally capping the orifice 88, as shown in FIG. 4, so that there is no longer any possibility of communication between the interior volume 96 and the exterior environment.

The control method, preferably including such a preliminary detection step, also includes a second step of selectively commanding introduction of pressurized fluid into the nozzle 56 via the feed pipe 86 so that the pressurized fluid is not introduced into the nozzle in the absence of a preform to be blow-molded in the mold 46 or so that the pressurized fluid is introduced into the passage 80 if and only if a preform 14 to be blow-molded is present in the mold 46.

Costs are advantageously reduced by preventing unnecessary consumption of a large volume of fluid when no blow-molding operation is necessary, the blow-molding fluid generally consisting of air sterilized beforehand.

For similar reasons, if the container 12 is manufactured by a stretch-blow-molding method, the control method than includes a third step of selectively commanding movement of the elongating rod 82 so that the rod does not slide downward unnecessarily in the absence of a preform 14 to be stretched in the mold 46 or so that the rod 82 is actuated only if a preform to be stretched is present in the mold 46.

The control unit 55 of the molding unit 42 is therefore advantageously controlled by the control method of the invention described above.

The molding unit 42 advantageously includes detection means (not shown) for detecting the presence or absence of a preform 14 in order to execute the second and third steps of the control method.

Such detection means are provided for example in the vicinity of the first transfer device 38 and downstream of a device for controlling the preform heating profile if the installation 10 is equipped with such a device.

The detection means are advantageously adapted to supply the control device 55 with a signal representative of the presence or absence of a preform 14 in the mold 46 to allow selective execution of the second and/or third steps of the control method.

Thanks to such detection means, the control device 55 is therefore able to command the various actuating means of the blow-molding or stretch-blow-molding means intended to cause on the one hand systematic movement of the nozzle 56 and on the other hand selective admission into the nozzle 56 of the blow-molding fluid and/or the movement of the elongating rod 82.

As shown in FIGS. 2 to 4, the actuating means of the blow-molding or stretch-blow-molding means preferably consist of pneumatic actuating means such as pneumatic actuators.

Alternatively, the actuating means controlled by the control device 55 consist of hydraulic or electrical actuating means.

By raising the level of bacteriological safety, the control method of the invention significantly improves the quality of the manufactured containers.

The installation 10 advantageously includes a system (not shown) for blowing filtered air into the interior of the enclosure 52 adapted to project a flow of air over at least the feed area 40 and the evacuation area 48 in which each mold 46 is in the open position respectively awaiting the introduction of a preform 14 or the extraction of a container 12.

The system is advantageously able to blow a continuous laminar flow of filtered air, preferably aseptic or sterile air, whether the installation is operating or stopped.

Such a filtered air blowing system further limits the risk of airborne particle contamination of the interior volume 96 of the mold 46.

The invention claimed is:

1. A method of controlling an installation (10) for manufacturing containers (12) or bottles, by blow-molding or by stretch-blow-molding, comprising:
   a normal operating mode in a presence of a perform (14) in a mold (46), the normal operating mode including at least one first step of, the mold (46) being in a closed position, vertical lowering of at least one blow-molding or stretch-blow-molding nozzle (56) toward a bottom position; and
   a special operating mode in an absence of the preform (14) in the mold (46), with the mold (46) being in a closed position, vertical lowering of the at least one nozzle (56) toward the bottom position so that, whether the installation (10) is operating or stopped, communication between an interior volume (96) of the mold (46) and an exterior environment is interrupted and the interior volume (96) of the mold (46) is isolated from the exterior environment to prevent the risk of airborne particle contamination,
   wherein the installation (10) includes at least one molding unit (42) equipped with a control device (55) adapted to control movement of the at least one nozzle (56) which is associated with the mold (46), in which the at least one nozzle (56) is mounted to be mobile vertically between a top position and a bottom position in which, the mold (46) being in a closed position, the at least one nozzle (56) caps at least one orifice (88) for the neck of the preform (14) that includes a top horizontal wall (90) of the mold (46).

2. The method as claimed in claim 1, wherein the method includes detecting the presence or absence of the preform (14) in the mold (46).

3. The method as claimed in claim 2, wherein in the special operating mode, the method is selectively commanding introduction into the at least one nozzle (56) of the fluid under pressure so that the fluid under pressure is not introduced into the nozzle (56) in the absence of the preform (14) in the mold (46).

4. The method as claimed in claim 3, wherein in the special operating mode the method includes selectively commanding movement of the elongating rod (82) so that downward sliding of the rod (82) is not effected in the absence of the preform (14) in the mold (46).

5. A method of controlling an installation (10) for manufacturing containers (12) or bottles, by blow-molding or by stretch-blow-molding, comprising:
   a normal operating mode in a presence of a perform (14) in a mold (46), the normal operating mode including at least one first step of, the mold (46) being in a closed position, vertical lowering of at least one blow-molding or stretch-blow-molding nozzle (56) toward a bottom position; and
   a special operating mode in an absence of the preform (14) in the mold (46), with the mold (46) being in a closed position, vertical lowering of the at least one nozzle (56) toward the bottom position so that, whether the installation (10) is operating or stopped, communication between an interior volume (96) of the mold (46) and an exterior environment is interrupted and the interior volume (96) of the mold (46) is isolated from the exterior environment to prevent the risk of airborne particle contamination.

6. The method as claimed in claim 5, wherein the installation (10) includes at least one molding unit (42) equipped with a control device (55) adapted to control movement of the at least one nozzle (56) which is associated with the mold (46), in which the at least one nozzle (56) is mounted to be mobile vertically between a top position and a bottom position in which, the mold (46) being in a closed position, the at least one nozzle (56) caps at least one orifice (88) for the neck of the preform (14) that includes a top horizontal wall (90) of the mold (46).

7. The method as claimed in claim 5, wherein the method includes detecting the presence or absence of the preform (14) in the mold (46).

8. The method as claimed in claim 7, wherein in the special operating mode, the method is selectively commanding introduction into the at least one nozzle (56) of the fluid under pressure so that the fluid under pressure is not introduced into the nozzle (56) in the absence of the preform (14) in the mold (46).

9. The method as claimed in claim 8, wherein in the special operating mode the method includes selectively commanding movement of the elongating rod (82) so that downward sliding of the rod (82) is not effected in the absence of the preform (14) in the mold (46).

\* \* \* \* \*